United States Patent [19]
Barbee et al.

[11] Patent Number: 5,116,892
[45] Date of Patent: May 26, 1992

[54] THERMOSETTING POWDER COATING COMPOSITIONS

[75] Inventors: Robert B. Barbee; Glenn C. Jones, both of Kingsport, Tenn.

[73] Assignee: Eastman Kodak Company, Rochester, N.Y.

[21] Appl. No.: 733,582

[22] Filed: Jul. 22, 1991

[51] Int. Cl.$^5$ .................. C08K 5/3435; C08K 5/09; C08J 3/24
[52] U.S. Cl. ................................ 524/99; 427/185; 427/195; 428/418; 525/327.3; 525/386
[58] Field of Search ............... 525/327.3, 386; 524/99; 427/195, 185; 428/418

[56] References Cited

U.S. PATENT DOCUMENTS

| | | | |
|---|---|---|---|
| 2,857,354 | 10/1958 | Fang | 525/386 |
| 3,058,947 | 10/1962 | Fryling et al. | 525/386 |
| 4,042,645 | 8/1977 | Hirota et al. | 525/285 |
| 4,046,727 | 9/1977 | Itoh et al. | 525/327.3 |
| 4,085,260 | 4/1978 | Labana et al. | 525/386 |
| 4,091,048 | 5/1978 | Labana et al. | 525/327.3 |
| 4,181,642 | 1/1980 | Hölle et al. | 525/386 |
| 4,346,144 | 8/1982 | Craven | 525/161 |
| 4,931,509 | 6/1990 | Yagishita et al. | 525/327.3 |

OTHER PUBLICATIONS

GCA Chemical Corporation Product Information Technical Bulletin 607, dated Nov. 14, 1984.

*Primary Examiner*—Veronica P. Hoke
*Attorney, Agent, or Firm*—Bernard J. Graves, Jr.; William P. Heath, Jr.

[57] ABSTRACT

Provided are novel thermosetting coating compositions comprised of a an epoxy containing acrylic copolymer and 1,3- and/or 1,4-cyclohexanedicarboxylic acid as crosslinking agents. Also provided are shaped or formed articles coated with the cured compositions. The compositions of the invention were found to provide coatings with markedly superior hardness.

12 Claims, No Drawings

THERMOSETTING POWDER COATING COMPOSITIONS

FIELD OF THE INVENTION

This invention belongs to the field of powder coatings. More particularly, this invention relates to thermosetting powder coating compositions containing a cyclohexanedicarboxylic acid as crosslinking agent.

BACKGROUND OF THE INVENTION

Plastic materials used in the manufacture of powder coatings are classified broadly as either thermosetting or thermoplastic. In the application of thermoplastic powder coatings, heat is applied to the coating on the substrate to melt the particles of the powder coating and thereby permit the particles to flow together and form a smooth coating.

Thermosetting coatings, when compared to coatings derived from thermoplastic compositions, generally are tougher, more resistant to solvents and detergents, have better adhesion to metal substrates and do not soften when exposed to elevated temperatures. However, the curing of thermosetting coatings has created problems in obtaining coatings which have, in addition to the above-stated desirable characteristics, good smoothness and flexibility. Coatings prepared from thermosetting powder compositions, upon the application of heat, may cure or set prior to forming a smooth coating, resulting in a relatively rough finish referred to as an "orange peel" surface. Such a coating surface or finish lacks the gloss and luster of coatings typically obtained from thermoplastic compositions. The "orange peel" surface problem has caused thermosetting coatings to be applied from organic solvent systems which are inherently undesirable because of the environmental and safety problems that may be occasioned by the evaporation of the solvent system. Solvent-based coating compositions also suffer from the disadvantage of relatively poor percent utilization, i.e., in some modes of application, only 60 percent or less of the solvent-based coating composition being applied contacts the article or substrate being coated. Thus, a substantial portion of solvent based coatings can be wasted since that portion which does not contact the article or substrate being coated obviously cannot be reclaimed.

Of particular interest are the acrylic copolymers containing glycidyl functional groups, such as PD 7610 containing glycidyl methacrylate (Mitsui Toatsu), which are crosslinked with dicarboxylic acids to produce highly weatherable powder coatings. Linear aliphatic dicarboxylic acids are known in the art and are preferred as crosslinking agents in such systems. Examples of such crosslinkers include those described by the general formula HOOC—$(CH_2)_n$—COOH, wherein n is an integer of 2 to 20. The most highly recommended dicarboxylic acid is dodecanedioic acid (DODA). However, the surface hardness of glycidyl acrylic-based coatings cured with DODA possess a relatively low (F—H) pencil hardness and only a little increase in hardness was obtained by the use of lower carbon number acids (See GCA Product Information Technical Bulletin 607).

SUMMARY OF THE INVENTION

The present invention provides thermosetting coating compositions comprising a coreactive mixture of an acrylic copolymer of a monoethylenically unsaturated monomer having at least epoxy group and at least one monoethylenically unsaturated monomer which is free of epoxy groups and 1,3-cyclohexanedicarboxylic acid and/or 1,4-cyclohexane-dicarboxylic acid as crosslinking agents. The compositions of the present invention upon application and curing provide coatings with markedly superior pencil hardness than the corresponding coatings cured with dodecanedioic acid.

DETAILED DESCRIPTION OF THE INVENTION

The present invention provides a thermosetting powder coating composition comprising an intimate blend comprising
(1) an acrylic copolymer comprising
  (a) about 10 to 35 percent by weight, based on the weight of the copolymer, of a monoethylenically unsaturated monomer having at least one epoxy group, and
  (b) about 65 to 90 percent by weight, based on the weight of the copolymer, of at least one monethylenically unsaturated monomer which is free of epoxy groups, wherein the copolymer has a number average molecular weight of about 1,000 to 8,000, a weight average molecular weight of about 2,000 to 16,000 and a glass transition temperature of 40° C. to 90° C., and
(2) a cross-linking effective amount of 1,3-cyclohexane dicarboxylic acid and/or 1,4-cyclohexanedicarboxylic acid.

The powder coatings of the present invention provide coatings which possess increased hardness over acrylic glycidyl coatings known in the prior art. For example, clear coatings of PD 7610 glycidyl resin cured with DODA, 1,4-cyclohexanedicarboxylic acid (1,4-CHDA), and 1,3-cyclohexanedicarboxylic acid (1,3-CHDA) have pencil hardnesses of F, 2H, and 3H, respectively. Coatings containing $TiO_2$ and PD 7610 glycidyl resin cured with DODA and 1,4-CHDA have pencil hardness of H and 3H, respectively.

The 1,4-CHDA preferably consists of from 10 to 99% trans-isomer. As a further preferred aspect of the present invention, the 1,4-CHDA is comprised of about 45% to about 85% trans-isomer. Use of 1,3-CHDA or low trans-isomer 1,4-CHDA are preferred in clear coatings applications. The amount of the crosslinking compound (2) present in the compositions of this invention can be varied depending on several factors such as those mentioned hereinabove relative to the amount of epoxy functional groups present on the copolymer (component (1)). Typically, the amount of crosslinking compound which will effectively crosslink the copolymer to produce coatings having a good combination of properties is in the range of about 5 to 30 weight percent, preferably 10 to 25 weight percent, based on the total weight of component (1) and component (2).

Other dicarboxylic acids may be employed in combination with the CHDA in minor amounts of about 1 to 20 weight percent based on the total amount of crosslinker. Linear aliphatic dicarboxylic acids of the general structure $HOOC(CH_2)_nCOOH$, wherein n is an integer of about 2 to 20 are preferred. Examples of such include adipic acid, succinic acid, sebacic acid, citric acid, itaconic acid, azelaic acid, dodecanedioic acid, and the like.

The glycidyl copolymer resins referred to above as component (1) are well known in the art and are commercially available as, for example, PD 7610 resin, manufactured by Mitsui Toatsu. Typical compositions are described in U.S. Pat. Nos. 4,042,645 and 4,346,144, incorporated herein by reference and generally consist of about 10 to 40 percent by weight of a monoethylenically unsaturated monomer having at least one epoxy group and 60 to 90 weight percent of one or more monoethylenically unsaturated monomers having no epoxy groups. Preferred monomers containing epoxy groups are glycidyl acrylate and glycidyl methacrylate. Preferred monomers having no epoxy groups are styrene and esters of acrylic or methacrylic acid such as methyl methacrylate and n-butyl methacrylate.

The glycidyl copolymer resin preferably has a number average molecular weight of about 1,000 to 8,000, most preferably 2,000 to 5,000, and a weight average molecular weight of about 2,000 to 16,000 preferably 4,000 to 12,000 as determined by gel permeation chromatography in tetrahydrofuran, and a glass transition temperature of about 40° to 100° C. as determined by Differential Scanning Calorimetry (DSC).

The glycidyl copolymer resin may be prepared by conventional solution, emulsion, or bead polymerization techniques using conventional polymerization catalysts.

The powder coating compositions of this invention may be prepared from the compositions described herein by dry-mixing and then melt-blending component (1) and the cross linking compound (2), along with other additives commonly used in powder coatings, and then grinding the solidified blend to a particle size, e.g., an average particle size in the range of about 10 to 300 microns, suitable for producing powder coatings. For example, the ingredients of the powder coating composition may be dry blended and then melt blended in a Brabender or Werner & Pfleiderer twin screw extruder at 90° to 130° C., granulated and finally ground and sifted through a screen. The melt blending should be carried out at a temperature sufficiently low to prevent the premature curing of the powder.

Typical of the additives which may be present in the powder coating compositions include benzoin, flow aids or flow control agents which aid the formation of a smooth, glossy surface, stabilizers, pigments and dyes. Examples of such additives can be found in U.S. Pat. No. 4,346,144, incorporated herein by reference. Also, conventional dyes or pigments such as R960 titanium dioxide pigment marketed by Du Pont may be used.

Conventional ultraviolet light stabilizers and hindered amine light stabilizers may also be used. Thus, as a further aspect of the present invention, there is provided the above thermosetting powder coating compositions, further comprising one or more ultraviolet light screens and/or hindered amine light stabilizers. The function of such additives is to prevent or at least minimize degradation of the resultant finish by ultraviolet light. It is further preferred that both an ultraviolet light screen and a hindered amine light stabilizer be used together. Examples of ultraviolet light screens include 2-(o-hydroxylphenyl)benzotriazoles, nickel chelates, o-hydroxybenzophenones, or phenyl salicylates. Especially preferred is the ultraviolet screen sold by Ciba Geigy under the trade name TINUVIN 234. A preferred hindered amine light stabilizer is that sold by Ciba-Geigy under the trade name TINUVIN 144. When the ultraviolet light screen and/or hindered amine light stabilizer is present, it is preferably present in a concentration of about 0.3 to about 4 percent, based on the weight of the total composition.

The powder coating compositions preferably contain a flow aid, also referred to as flow control or leveling agents, to enhance the surface appearance of cured coatings of the powder coating compositions. Such flow aids typically comprise acrylic polymers and are available from several suppliers, e.g., MODAFLOW from Monsanto Company and ACRONAL from BASF. Other flow control agents which may be used include MODAREZ MFP available from Synthron, EX 486 available from Troy Chemical, BYK 360P available from BYK Mallinkrodt and PERENOL F-30-P available from Henkel. An example of one specific flow aid is an acrylic polymer having a molecular weight of about 17,000 and containing 60 mole percent 2-ethylhexyl methacrylate residues and about 40 mole percent ethyl acrylate residues. The amount of flow aid present may preferably be in the range of about 0.5 to 4.0 weight percent, based on the total weight of the resin component and the crosslinking agent.

The powder coating compositions may be deposited on various metallic and non-metallic (e.g., thermoplastic or thermoset composite) substrates by known techniques for powder deposition such as by means of a powder gun, by electrostatic deposition or by deposition from a fluidized bed. In fluidized bed sintering, a preheated article is immersed into a suspension of the powder coating in air. The particle size of the powder coating composition normally is in the range of 10 to 300 microns. The powder is maintained in suspension by passing air through a porous bottom of the fluidized bed chamber. The articles to be coated are preheated to about 250° to 400° F. (about 121° to 205° C.) and then brought into contact with the fluidized bed of the powder coating composition. The contact time depends on the thickness of the coating that is to be produced and typically is from 1 to 12 seconds. The temperature of the substrate being coated causes the powder to flow and thus fuse together to form a smooth, uniform, continuous, uncratered coating. The temperature of the preheated article also effects cross linking of the coating composition and results in the formation of a tough coating having a good combination of properties. Coatings having a thickness between 200 and 500 microns may be produced by this method.

The compositions also may be applied using an electrostatic process wherein a powder coating composition having a particle size of less than 100 microns, preferably about 15 to 50 microns, is blown by means of compressed air into an applicator in which it is charged with a voltage of 30 to 100 kV by high-voltage direct current. The charged particles then are sprayed onto the grounded article to be coated to which the particles adhere due to the electrical charge thereof. The coated article is heated to melt and cure the powder particles. Coatings of 40 to 120 microns thickness may be obtained.

Another method of applying the powder coating compositions is the electrostatic fluidized bed process which is a combination of the two methods described above. For example, annular or partially annular electrodes are mounted in the air feed to a fluidized bed so as to produce an electrostatic charge such as 50 to 100 kV. The article to be coated, either heated, e.g., 250° to 400° F., or cold, is exposed briefly to the fluidized powder. The coated article then can be heated to effect cross linking if the article was not preheated to a temperature sufficiently high to cure the coating upon contact of the coating particles with the article.

Further examples of formulation methods, additives, and methods of powder coating application may be found in *User's Guide to Powder Coating*, 2nd Ed., Emery Miller, editor, Society of Manufacturing Engineers, Dearborn, (1987).

The artificial weatherability of the coatings was determined by exposure of the coated panels in a Cyclic Ultraviolet Weathering Tester (QUV) with 313 nm fluorescent tubes. The test condition was 8 hours of light at 70° C. and 4 hours of condensation at 45° C.

Impact strength is determined by using a Gardner Laboratory, Inc., Impact Tester. A weight is dropped within a slide tube from a specified height to hit a punch having a ⅝ inch diameter hemispherical nose which is driven into the front (coated face) or back of the panel. The highest impact which does not crack the coating is recorded in inch-pounds, front and reverse.

The 20 degree and 60 degree gloss are measured using a gloss meter (Gardner Laboratory, Inc., Model GC-9095) according to ASTM D-523.

The pencil hardness of a coating is that of the hardest pencil that will not cut into the coating according to ASTM 3363-74 (reapproved 1980). The results are expressed according to the following scale: (softest) 6B, 5B, 4B, 3B, 2B, B, HB, F, H, 2H, 3H, 4H, 5H, 6H (hardest).

The compositions and coatings of this invention are further illustrated by the following examples. The inherent viscosities (I.V.; dl/g) referred to herein were measured at 25° C. using 0.5 g polymer per 100 mL of a solvent consisting of 60 parts by weight phenol and 40 parts by weight tetrachloroethane. Acid and hydroxyl numbers were determined by titration and are reported herein as mg of KOH consumed for each gram of polymer. The glass transition temperatures (Tg) were determined by differential scanning calorimetery (DSC) on the second heating cycle at a scanning rate of 20° C. per minute after the sample has been heated to melt and quenched to below the Tg of the polymer. Tg values are reported as the midpoint of the transition.

In the Experimental Section below, the powder coating compositions where electrostatically deposited on 3 inch by 9 inch panels of 20-gauge, polished, cold roll steel, the surface of which has been zinc phosphated (BONDERITE 37, The Parker Company). After deposition, the powder was heated to a temperature sufficient to cause the particles to flow and fuse together to form a smooth, uniform surface.

The coatings of our invention are further illustrated by the following examples.

EXPERIMENTAL SECTION

Example 1

This example illustrates the use of 1,4-CHDA containing 45% trans isomer as a curing agent for PD 7610. A powder coating composition was prepared from the following materials:
  866.0 g PD 7610;
  134.0 g 1,4-CHDA (45% trans isomer);
  10.0 g Benzoin;
  15.0 g MODAFLOW III;
  400 0 g TiO$_2$ (R960);
  10.0 g TINUVIN 144; and
  10.0 g TINUVIN 234.

The above materials were melt blended in a ZSK-30 twin screw extruder at 100° C., ground in a Bantam mill to which a stream of liquid nitrogen is fed, and classified through a 170 mesh screen on a KEK centrifugal sifter. The finely-divided, powder coating composition obtained had an average particle size of about 50 microns.

The powder coating composition was applied electrostatically to one side of the 3 inch by 9 inch panels described hereinabove. The coating was cured (crosslinked) by heating the coated panels at 177° C. in an oven for 20 minutes. The cured coatings were about 50 microns thick.

The coating on the panel had a pencil hardness of 3H, front impact strength of 20 inch-pounds and reverse of 10 inch-pounds, 20 and 60 degree gloss values of 50 and 83, respectively. After 1600 hours of QUV exposure, the coating retains 50% of the 20 degree gloss.

Example 2

This example illustrates the use of 1,4-CHDA containing 99% trans isomer as a curing agent for PD 7610. Using the procedure described in Example 1, a powder coating was prepared from the following materials:
  866.0 g PD 7610;
  134.0 g 1,4 CHDA (99% trans isomer);
  10.0 g Benzoin;
  15.0 g MODAFLOW III;
  400.0 g TiO$_2$ (R960);
  10.0 g TINUVIN 144; and
  10.0 g TINUVIN 234.

Using the procedure of Example 1, panels were coated with this powder coating composition and the coatings cured and evaluated. The coatings have a pencil hardness of 4H, front impact strength of 20, back impact strength of 10, and 20 and 60 degree gloss values of 31 and 71, respectively. After 1600 hours, the coating retained 50% of the 20 degree gloss.

Example 3

This example illustrates the use of 1,4-CHDA containing 45% trans isomer as a curing agent for PD 7610 in a clear coat. Using the procedure described in Example 1, a powder coating was prepared from the following materials:
  500.0 g PD 7610;
  77.4 g 1,4-CHDA (45% trans isomer);
  6.0 g Benzoin;
  9.0 g MODAFLOW III;
  6.0 g TINUVIN 144; and
  6.0 g TINUVIN 234.

Using the procedure of Example 1, panels were coated with this powder coating composition and the coatings cured and evaluated. The coatings have a pencil hardness of 2H, front impact strength of 40, back impact strength of 10, and 20 and 60 degree gloss values of 46 and 77, respectively.

Example 4

This example illustrates the use of 1,4-CHDA containing 10% trans-isomer as a curing agent for PD 7610 in a clear coat. Using the procedure described in Example 1, a powder coating was prepared from the following materials:
  866.0 g PD 7610;
  134.0 g 1,4-CHDA (10% trans isomer);
  10.0 g Benzoin;
  15.0 g MODAFLOW III;
  10.0 g TINUVIN 144; and
  10.0 g TINUVIN 234.

Using the procedure of Example 1, panels were coated with this powder coating composition and the coatings cured and evaluated. The coatings have a pencil hardness of 2H, front impact strength of 20, back impact strength of 10, and 20 and 60 degree gloss values of 71 and 91, respectively.

Example 5

This example illustrates the use of 1,3-CHDA as a curing agent for PD 7610 in a clear coat. Using the procedure described in Example 1, a powder coating was prepared from the following materials:
866.0 g PD 7610;
134.0 g 1,3-CHDA;
10.0 g Benzoin;
15.0 g MODAFLOW III;
10.0 g TINUVIN 144; and
10.0 g TINUVIN 234.

Using the procedure of Example 1, panels were coated with this powder coating composition and the coatings cured and evaluated. The coatings have a pencil hardness of 3H, front impact strength of 20, back impact strength of 10, and 20 and 60 degree gloss values of 81 and 93, respectively.

Comparative Example 1

A powder coating composition was prepared from the following materials:
829.0 g PD 7610;
171.0 g Dodecanedioic acid;
10.0 g Benzoin;
15.0 g MODAFLOW III;
400 0 g TiO$_2$ (R960);
10.0 g TINUVIN 144; and
10.0 g TINUVIN 234.

Using the procedure of Example 1, panels were coated with this powder coating composition and the coatings cured and evaluated. The coatings have a pencil hardness of H, front impact strength of 40, back impact strength of 10, and 20 and 60 degree gloss values of 58 and 88, respectively. After 1600 hours, the coating retains 50% of the 20 degree gloss.

Comparative Example 2

A powder coating composition was prepared from the following materials:
500.0 g PD 7610;
103.0 g Dodecanedioic acid;
6.0 g Benzoin;
9.0 g MODAFLOW III;
6.0 g TINUVIN 144; and
6.0 g TINUVIN 234.

Using the procedure of Example 1, panels were coated with this powder coating composition and the coatings cured and evaluated. The coatings have a pencil hardness of F, front impact strength of 40, back impact strength of 20, and 20 and 60 degree gloss values of 81 and 92, respectively.

Comparative Example 3

A powder coating composition was prepared from the following materials:
884.0 g PD 7610;
116.0 g Adipic acid;
10.0 g Benzoin;
15.0 g MODAFLOW III;
400.0 g TiO$_2$ (R960);
10.0 g TINUVIN 144; and
10.0 g TINUVIN 234.

Using the procedure of Example 1, panels were coated with this powder coating composition and the coatings cured and evaluated. The coatings have a pencil hardness of 2H, front impact strength of 20, back impact strength of 10, and 20 and 60 degree gloss values of 41 and 84, respectively. After 1600 hours, the coating retains 50% of the 2 degree gloss.

We claim:

1. A thermosetting powder coating composition comprising an intimate blend comprising
   (1) an acrylic copolymer comprising
      (a) about 10 to 35 percent by weight, based on the weight of the copolymer, of a monoethylenically unsaturated monomer having at least one epoxy group, and
      (b) about 65 to 90 percent by weight, based on the weight of the copolymer, of at least one monethylenically unsaturated monomer which is free of epoxy groups, wherein the copolymer has a number average molecular weight of about 1,000 to 8,000, a weight average molecular weight of about 2,000 to 16,000 and a glass transition temperature of 40° C. to 90° C., and
   (2) a crosslinking effective amount of 1,3-cyclohexane dicarboxylic acid and/or 1,4-cyclohexanedicarboxylic acid.

2. The thermosetting powder coating composition of claim 1 wherein component (2) consists essentially of 1,3-cyclohexanedicarboxylic acid.

3. The thermosetting powder coating composition of claim 1, wherein component (2) consists essentially of 1,4-cyclohexanedicarboxylic acid.

4. The thermosetting powder coating composition of claim 1, further comprising one or more linear dicarboxylic acids in an amount of about 1 to about 20 weight percent based on the total weight of component (2).

5. The thermosetting powder coating composition of claim 1, further comprising one or more ultraviolet light screens and/or hindered amine light stabilizers.

6. A shaped or formed article coated with the cured thermosetting coating composition of claim 1.

7. A thermosetting powder coating composition comprising an intimate blend comprising
   (1) an acrylic copolymer comprising
      (a) about 10 to 35 percent by weight, based on the weight of the copolymer, of a monoethylenically unsaturated monomer having at least one epoxy group, and
      (b) about 65 to 90 percent by weight, based on the weight of the copolymer, of at least one monethylenically unsaturated monomer which is free of epoxy groups, wherein the copolymer has a number average molecular weight of about 2,000 to 5,000, a weight average molecular weight of about 4,000 to 12,000 and a glass transition temperature of 40° C. to 90° C., and
   (2) a crosslinking effective amount of 1,3-cyclohexanedicarboxylic acid and/or 1,4-cyclohexanedicarboxylic acid.

8. The thermosetting powder coating composition of claim 7, wherein component (2) consists essentially of 1,3-cyclohexanedicarboxylic acid.

9. The thermosetting powder coating composition of claim 7, wherein component (2) consists essentially of 1,4-cyclohexanedicarboxylic acid.

10. The thermosetting powder coating composition of claim 7, further comprising one or more linear dicarboxylic acids in an amount of about 1 to about 20 weight percent based on the total weight of component (2).

11. The thermosetting powder coating composition of claim 7, further comprising one or more ultraviolet light screens and/or hindered amine light stabilizers.

12. A shaped or formed article coated with the cured thermosetting coating composition of claim 7.

* * * * *